United States Patent
Perdue

(10) Patent No.: US 7,565,951 B1
(45) Date of Patent: Jul. 28, 2009

(54) WALL MOUNTABLE ACOUSTIC ASSEMBLY FOR INDOOR ROOMS

(76) Inventor: Joab Jay Perdue, 4210 Hester Dr., Amarillo, TX (US) 79124

( * ) Notice: Subject to any disclaimer, the term of this patent is extended or adjusted under 35 U.S.C. 154(b) by 237 days.

(21) Appl. No.: 11/498,935

(22) Filed: Aug. 4, 2006

(51) Int. Cl.
E04B 1/82 (2006.01)
E04B 1/99 (2006.01)

(52) U.S. Cl. .................. 181/287; 181/30; 181/284; 181/295

(58) Field of Classification Search ............... 181/287, 181/295, 290, 293, 30, 284; 52/144, 145
See application file for complete search history.

(56) References Cited

U.S. PATENT DOCUMENTS

| | | | | |
|---|---|---|---|---|
| 1,611,483 A | * | 12/1926 | Newsom | 52/144 |
| 2,652,126 A | * | 9/1953 | Mazer | 181/293 |
| 2,935,152 A | * | 5/1960 | Maccaferri | 181/290 |
| 3,232,370 A | * | 2/1966 | Jaffe | 181/30 |
| 3,435,909 A | * | 4/1969 | Urch et al. | 181/30 |
| 3,630,309 A | * | 12/1971 | Wenger et al. | 181/30 |
| 3,846,949 A | * | 11/1974 | Okawa | 52/438 |
| 3,908,787 A | * | 9/1975 | Wenger et al. | 181/30 |
| 3,975,850 A | * | 8/1976 | Giaume | 406/10 |
| 4,158,936 A | | 6/1979 | Fulton | |
| 4,362,222 A | * | 12/1982 | Hellstrom | 181/30 |
| 4,605,088 A | | 8/1986 | Sickels | |
| 4,682,670 A | | 7/1987 | Lerner et al. | |
| 4,750,586 A | * | 6/1988 | Lerner et al. | 181/295 |
| 5,035,298 A | | 7/1991 | Noxon | |
| 5,044,103 A | * | 9/1991 | Izenberg | 40/617 |
| 5,525,765 A | | 6/1996 | Freiheit | |
| 5,579,614 A | * | 12/1996 | Dorn | 52/144 |
| 5,641,950 A | | 6/1997 | Kotter | |
| 5,896,710 A | | 4/1999 | Hoyle | |
| 5,992,561 A | | 11/1999 | Holben et al. | |
| 6,085,861 A | * | 7/2000 | Jines | 181/30 |
| 6,158,176 A | * | 12/2000 | Perdue | 52/144 |
| 6,209,680 B1 | * | 4/2001 | Perdue | 181/295 |
| 6,520,282 B1 | * | 2/2003 | Hadzic et al. | 181/199 |
| 6,530,451 B2 | | 3/2003 | Noselli | |
| 6,782,670 B2 | * | 8/2004 | Wendt | 52/506.07 |
| 6,782,971 B2 | | 8/2004 | Dutton et al. | |
| 6,892,856 B2 | | 5/2005 | Takahashi et al. | |
| 2004/0159062 A1 | * | 8/2004 | Donlin et al. | 52/506.01 |

* cited by examiner

Primary Examiner—Jeffrey Donels
Assistant Examiner—Jeremy Luks
(74) Attorney, Agent, or Firm—Norman B. Rainer

(57) ABSTRACT

An acoustic assembly including a thin sound absorbing panel supported by foldable mounting brackets is adapted to be mounted upon the walls of an indoor listening enclosure. The space behind the panel functions as an acoustic diffusion chamber which augments the acoustic performance of the panel. A number of such assemblies are employed in a manner such that the panels are offset from the wall and downwardly angled.

6 Claims, 3 Drawing Sheets

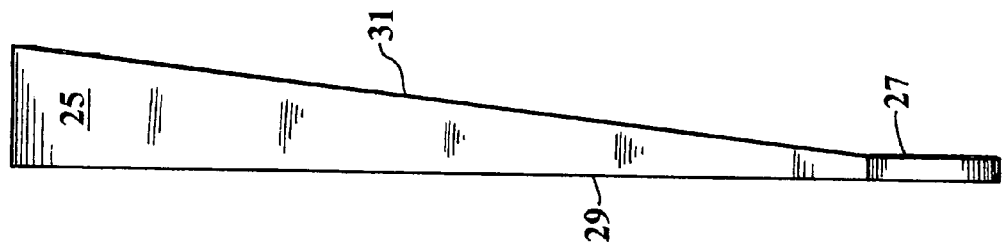
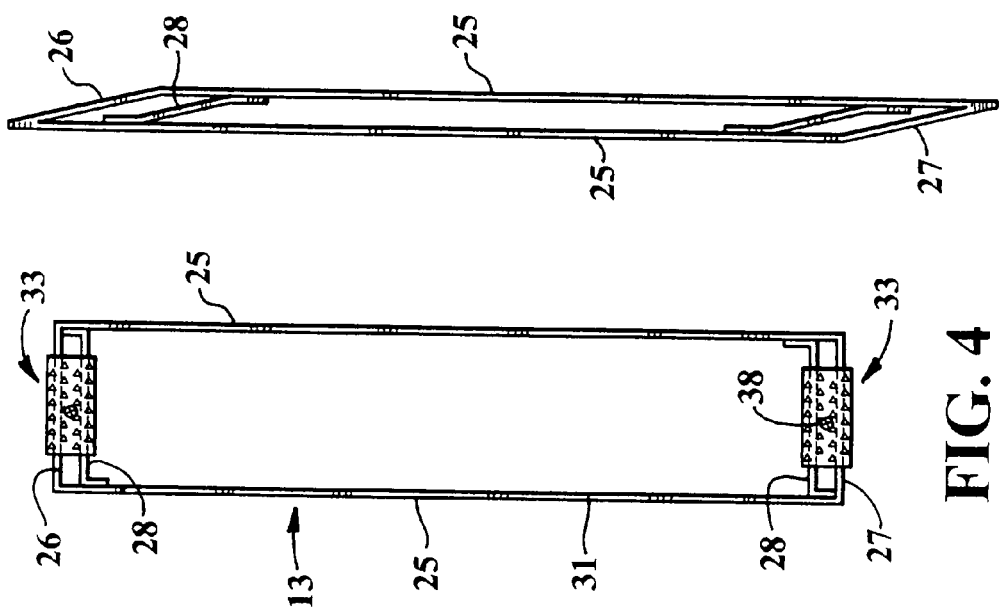
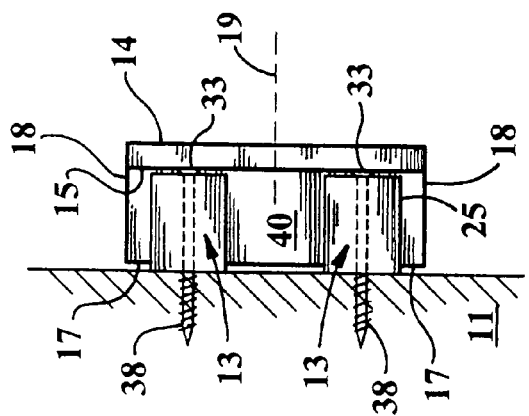
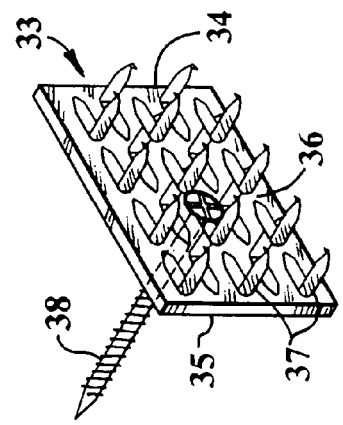

__US 7,565,951 B1__

WALL MOUNTABLE ACOUSTIC ASSEMBLY FOR INDOOR ROOMS

BACKGROUND OF THE INVENTION

1. Field of the Invention

This invention relates to the improvement of acoustic qualities of an indoor room, and more particularly concerns components which can be assembled and installed upon the walls of a room for improving the acoustic quality thereof.

2. Description of the Prior Art

In indoor rooms intended primarily for listening to music, whether residential rooms used for watching television or listening to recorded music, or public auditoriums or enclosures employed for listening to live music, it is desired that the quality of the heard sound be as accurate as the produced sound.

It is well known that rooms can produce distortional acoustic effects such as echoes, reverberations, amplified bass tones, and uneven volume distribution throughout the room. Systems for improving the sound quality of indoor rooms have been disclosed in U.S. Pat. Nos. 4,605,088; 4,682,670; 5,035,298; 5,896,710; 6,530,451; 6,782,871 and elsewhere. Such prior systems generally employ large volume panels that attach to the walls, or employ floor-standing structures of movable or adjustable nature. Such panels and related structures are usually of bulky, heavy and expensive construction, or difficult to install, or detract from the aesthetic appearance or floor space of the room.

It is accordingly an object of the present invention to provide a system for improving the acoustic quality of an indoor enclosure such as a room without detracting from its usable floor space.

It is a further object of this invention to provide a kit of components and installation instructions for improving the acoustic quality of an indoor enclosure.

It is another object of the present invention to provide inexpensive components and a specialized manner of installing said components to improve the acoustic quality of an indoor enclosure.

It is a still further object of this invention to provide an improved residential listening room.

These objects and other objects and advantages of the invention will be apparent from the following description.

SUMMARY OF THE INVENTION

The above and other beneficial objects and advantages are accomplished in accordance with the present invention by an acoustic assembly, a plurality of which are intended for installation onto walls of an indoor enclosure further bounded by a floor and ceiling, said acoustic assembly comprised of:

a) a self-supporting panel of one to two inch thickness bounded in part by flat front and rear surfaces and a perimeter having at least one plane of symmetry, and fabricated of inter-bonded fibrous material capable of absorbing sound energy, and b) at least one mounting bracket adapted to removably attach to said rear surface and said wall in a manner to space said panel away from the wall and downwardly angled along a plane of symmetry toward the floor of said enclosure, thereby creating an acoustically active zone between said wall and panel, said mounting bracket being of a collapsible construction which minimizes shipping weight and volume.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a top view of the embodiment of FIG. 1.

FIG. 4 is an enlarged front view of the mounting bracket component of the assembly of FIG. 1, shown in its operational state.

FIG. 5 is a front view of the mounting bracket of FIG. 4, shown in its folded state.

FIG. 6 is a side view of said mounting bracket in its folded state.

FIG. 7 is a perspective view of an embodiment of a securing assembly useful for attaching the acoustic assembly of FIG. 1 to a wall.

DESCRIPTION OF THE PREFERRED EMBODIMENT

Figure 2:
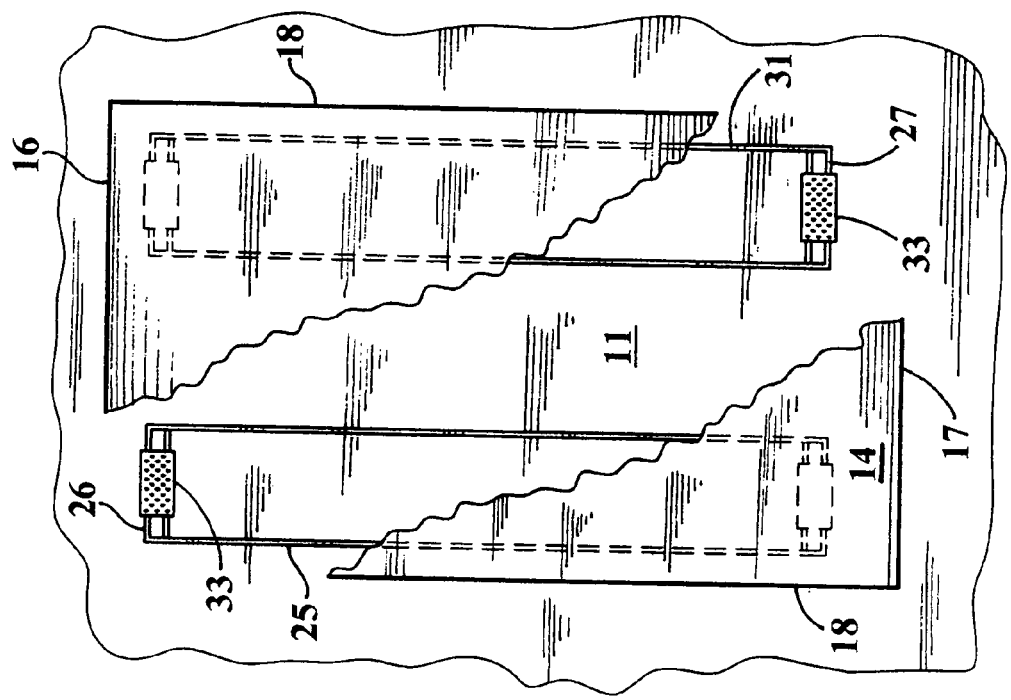
FIG. 2 is a front view of the embodiment of FIG. 1 with portions broken away to reveal otherwise hidden details.
Figure 1:
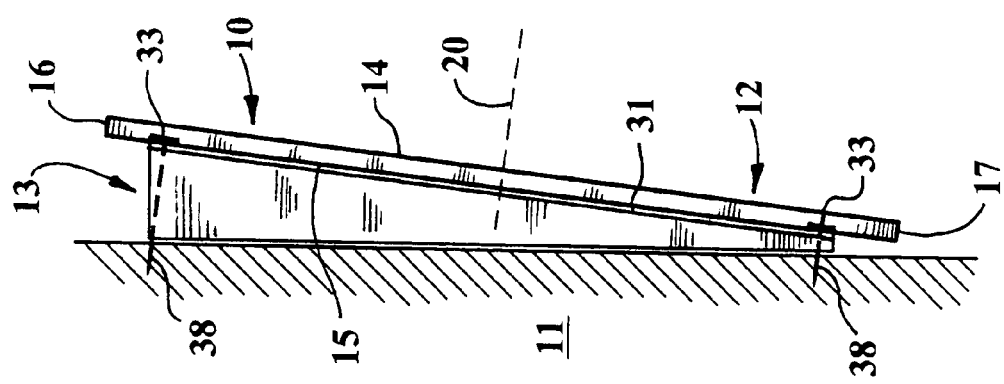
FIG. 1 is a side view of an embodiment of the acoustic assembly of this invention shown mounted upon a vertical wall of a room.

Referring now to FIGS. 1 and 2, an acoustic assembly 10 of the present invention is shown mounted upon a wall 11 and comprised of panel 12 and mounting bracket 13.

Panel 12 is a self-supported structure bounded in part by flat front and rear surfaces 14 and 15, respectively, and defining therebetween a uniform thickness of between one and two inches. The illustrated embodiment of said panel is of rectangular contour, having a perimeter comprised of top and bottom edge surfaces, 16 and 17, respectively, and side edge surfaces 18. Such rectangular configuration accordingly has two planes of symmetry, shown as vertical plane 19 and horizontal plane 20. The panels may have vertically measured lengths of about 4 feet and horizontally measured widths between 2 and 8 feet.

Panel 12 is preferably fabricated of inter-bonded fibrous material capable of absorbing sound energy. Suitable fibrous materials include, for example, rock wool and fiberglass. Bonding agents such as thermosetting phenol-formaldehyde, urea-formaldehyde and melamine-formaldehyde resins may be employed for inter-bonding at levels of about 3% to 5% based upon the overall weight of the panel. Preferred panels have a bulk density between 5 and 9 pounds per cubic foot. The panels may also be provided with tautly fitted fabric coverings. Said panel and any covering are preferably fabricated of fire-resistant materials.

The illustrated embodiment of mounting bracket 13 is fabricated of rigid sheet material such as corrugated cardboard or corrugated plastic material, and comprised of paired vertical members 25 joined by upper and lower connecting struts 26 and 27, respectively. Reinforcing secondary struts 28 may be inwardly spaced from struts 26 and 27. The rear-edges 29 of said vertical members, connecting struts and secondary struts are coplanar and adapted to fit flush against a wall 11 in removable attachment thereto. The forward edges 31 of vertical members 25 are downwardly tapered in parallel relationship. The entire bracket structure is foldable to a compact state, as shown in FIG. 5.

A securing assembly 33 is employed at the upper and lower extremities of each mounting bracket for the dual purposes of attaching the mounting bracket to the associated wall, and securing panel 12 to the forward edges 31 of the mounting bracket. In the embodiment of securing assembly 33 exemplified in FIG. 7, an apertured plate 34 having a flat inside surface 35 and an outer surface 36 equipped with engaging means 37 such as a multitude of impale spikes is penetrated by an elongated fastener such as screw 38 adapted to enter wall 11. The placement of a securing assembly at the upper extremity of mounting bracket 13 is such that flat inside surface 35 is in spanning abutment with upper strut 26 and associated secondary strut 28. Placement of a securing assembly at the lower extremity of mounting bracket 13 is such that flat inside surface 35 is in spanning contact with lower strut 27 and associated secondary strut 28. Panel 12 is attached to a mounting bracket equipped with securing assemblies 33 merely by pressing the panel onto the impale spikes. In alternative embodiments, the engaging means 37 may be VELCRO hook and loop fastening material.

At least two mounting brackets 13 are utilized in laterally spaced relationship in securing a panel 12. A greater number of brackets may be used in the case of large sized panels 12. The brackets are positioned in vertical orientation on the wall with the lower strut 27 downwardly directed. By virtue of the downwardly tapered configuration of the forward edges 31 of said mounting brackets, the secured panel is angled downwardly toward the floor of the listening enclosure at an angle of between about 4 and 8 degrees. The space behind the mounted panel and further bounded by wall 11 and paired brackets 13 has been found to function as a diffusion chamber 40 which augments the acoustic performance of panels 12.

Figure 8:
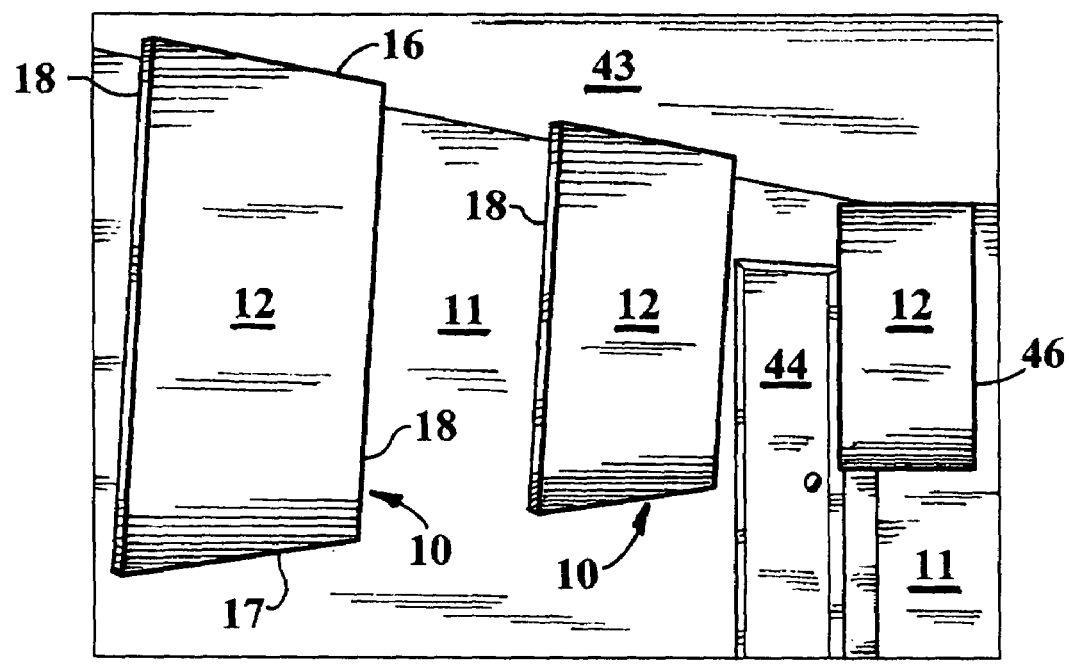
FIG. 8 is a fragmentary perspective view of an indoor listening enclosure equipped with acoustic assemblies of the present invention.
Figure 9:
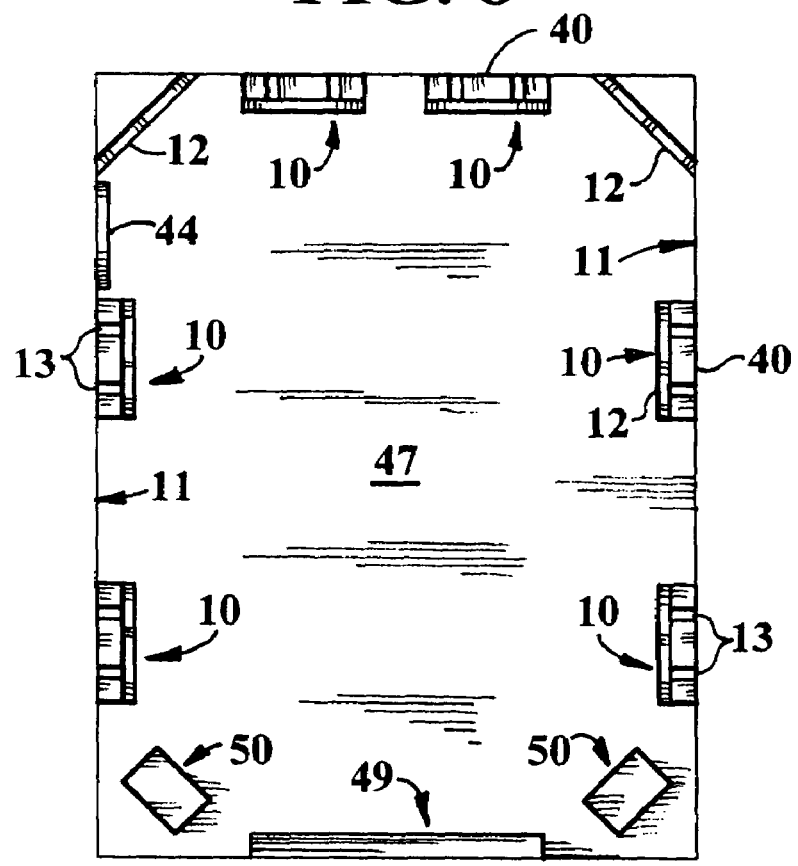
FIG. 9 is a top view of the enclosure of FIG. 8.

FIGS. 8 and 9 illustrate an embodiment of a listening enclosure equipped with acoustic assemblies 10 of the present invention. Said enclosure is exemplified as an indoor room of rectangular shape, having vertical walls 11, ceiling 43, entrance door 44 and floor 47. A video screen 49 and paired loudspeakers 50 are located at one extremity of the room. In FIG. 8, two acoustic assemblies 10 are shown in spaced apart relationship on one wall, and a third acoustic assembly is shown spanning a corner of the room where walls 11 meet. In general, it is preferable to position panels 12 high upon the wall, and sometimes in contact with ceiling 43.

Because of the flat configuration of panels 12, and the foldable nature of brackets 13, the components of the acoustic assembly of this invention can be stored and shipped as a compact package of low weight and volume. The simplified manner of assembly permits quick and easy installation of the assemblies in the listening enclosure.

In a listening enclosure of the present invention such as shown in FIGS. 8 and 9, the reverberation time for sounds in the frequency range of 125-2000 Hz is reduced to a range of 0.85 to 0.90 seconds. This is a significant improvement over reverberation times of 1.05 to 1.70 seconds for a bare room, and 0.95 to 1.45 seconds for the same room equipped with bulky prior art floor and wall acoustic modifying devices. Insofar as diminished reverberation time is one measure of the subjectively perceived quality of sound and the accurate transmission of sound from its origin to the listener's ears, the listening room of this invention is clearly an improvement over prior art listening rooms. The listening room of this invention also desirably minimizes nodes throughout the room from levels of about plus or minus 20 decibels to about plus or minus 5 decibels. The lower nodes means that the sound intensity within the room will be uniform, regardless of where the listener is positioned. The room is further improved with respect to removal of echoes and overly intense or sustained bass sounds.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An acoustic assembly, a plurality of which are intended for installation onto walls of an indoor enclosure further bounded by a floor and ceiling, said acoustic assembly comprised of:
   a) a self-supporting panel of uniform thickness bounded in part by flat front and rear surfaces and a perimeter having at least one plane of symmetry, and fabricated of inter-bonded fibrous material that absorbs sound energy, and
   b) at least two mounting brackets releasibly attached in horizontally spaced apart relationship to said rear surface and attachable to said wall in a manner to space said panel away from said wall and downwardly angled toward said floor, thereby creating an acoustically active zone between said wall and panel, said mounting brackets being fabricated of rigid sheet material and of a collapsible construction that reversibly folds to a compact state which minimizes shipping volume.

2. The acoustic assembly of claim 1 wherein said panel is of rectangular contour and has a thickness of about one inch to two inches.

3. The acoustic assembly of claim 2 wherein said panel has a bulk density between 5 and 9 pounds per cubic foot.

4. An acoustic assembly, a plurality of which are intended for installation onto walls of an indoor enclosure further bounded by a floor and ceiling, said assembly comprised of:
   a) a self-supporting panel of uniform thickness of between one and two inches, having a bulk density between 5 and 9 pounds per cubic foot, bounded in part by flat front and rear surfaces and a perimeter having at least one plane of symmetry, and fabricated of inter-bonded fibrous material that absorbs sound energy, and
   b) at least two mounting brackets attached in horizontally spaced apart relationship to said rear surface and attachable to said wall in a manner to space said panel away from the wall and downwardly angled toward said floor, thereby creating an acoustically active zone between said wall and panel, each mounting bracket being fabricated of rigid sheet material and comprised of paired vertically oriented elongated members bounded by forward edges downwardly tapered in parallel relationship and rear edges joined by upper and lower horizontal connecting struts, forming a collapsible construction that reversibly folds to a compact state which minimizes shipping volume.

5. The acoustic assembly of claim 4 further comprising securing assemblies for interaction with the upper and lower connecting struts of each mounting bracket to attach said bracket to a wall and facilitate attachment of said panel to said mounting bracket.

6. An acoustic assembly, a plurality of which are intended for installation onto walls of an indoor enclosure further bounded by a floor and ceiling, said acoustic assembly comprised of:

a) a self-supporting panel of uniform thickness bounded by flat front and rear surfaces and a rectangular perimeter, and fabricated of inter-bonded fibrous material that absorbs sound energy, b) at least two mounting brackets releasibly attached in horizontally spaced apart relationship to said rear surface and attachable to said wall in a manner to space said panel away from said wall and downwardly angled toward said floor, thereby creating an acoustically active zone bounded by said wall, panel and brackets, and c) two securing assemblies interactive with each mounting bracket to attach said bracket to a wall and facilitate attachment of said panel to said mounting bracket.

\* \* \* \* \*